United States Patent [19]
Boeckner, Jr. et al.

[11] Patent Number: 5,583,723
[45] Date of Patent: Dec. 10, 1996

[54] FLUX GENERATOR FOR A ROTARY ACTUATOR MOTOR WITH AN INTEGRATED ACTUATOR LATCH FOR A DISK DRIVE

[75] Inventors: James W. Boeckner, Jr., Broomfield; Shirley Chessman, Erie, both of Colo.

[73] Assignee: Maxtor Corporation, Longmont, Colo.

[21] Appl. No.: 243,044

[22] Filed: May 16, 1994

Related U.S. Application Data

[63] Continuation of Ser. No. 960,713, Oct. 14, 1992, abandoned.

[51] Int. Cl.⁶ ........................................... G11B 5/55
[52] U.S. Cl. ................................. 360/105; 360/106
[58] Field of Search ..................... 360/106, 105, 360/902, 77.03, 77.08, 97.01; 369/215, 219, 222; 310/36, 154

[56]  References Cited

U.S. PATENT DOCUMENTS

| | | | |
|---|---|---|---|
| 4,751,597 | 6/1988 | Anderson | 360/106 |
| 4,775,908 | 10/1988 | Ycas | 360/106 |
| 4,985,793 | 1/1991 | Anderson | 360/105 |
| 5,025,335 | 6/1991 | Stefansky | 360/902 |
| 5,193,037 | 3/1993 | Pace | 360/106 |
| 5,278,709 | 1/1994 | Thornton et al. | 360/97.01 |

FOREIGN PATENT DOCUMENTS 9005359  5/1990  WIPO .................... 360/106

Primary Examiner—Stuart S. Levy
Assistant Examiner—Kevin M. Watkins
Attorney, Agent, or Firm—Sheridan Ross & McIntosh

[57]  ABSTRACT

A flux generator for a rotary actuator motor with an integrated magnetic latch is disclosed. A magnetically permeable return plate housing forms a first air gap for receiving a coil coupled to the actuator for positioning read/write heads over a disk platter of the disk drive, and forms a second air gap for receiving a latch tab coupled to the actuator.

10 Claims, 2 Drawing Sheets

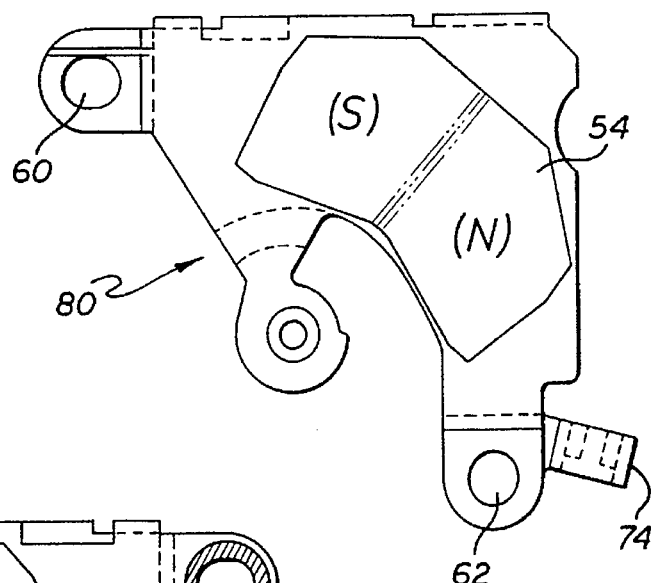
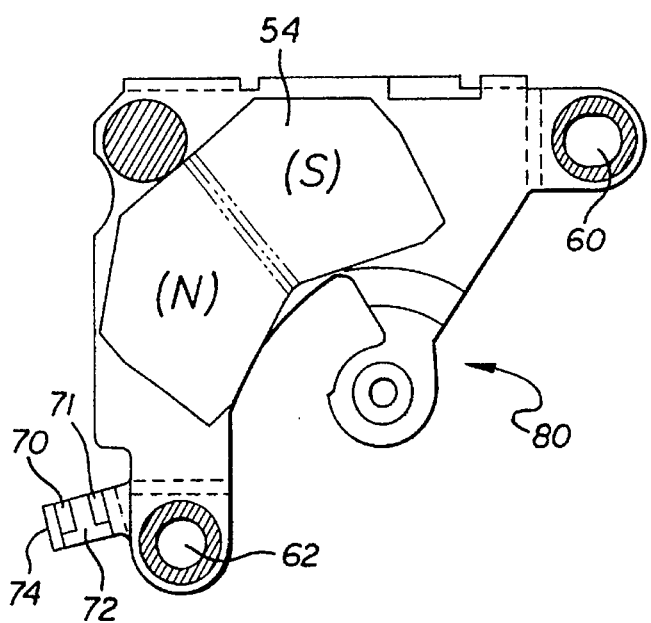
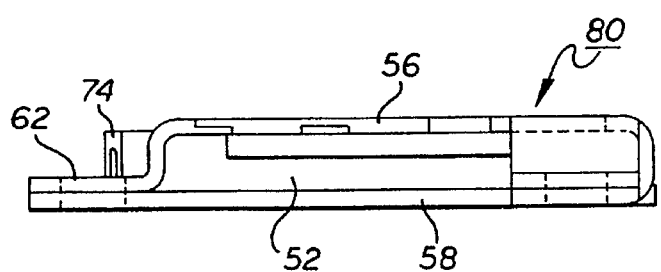
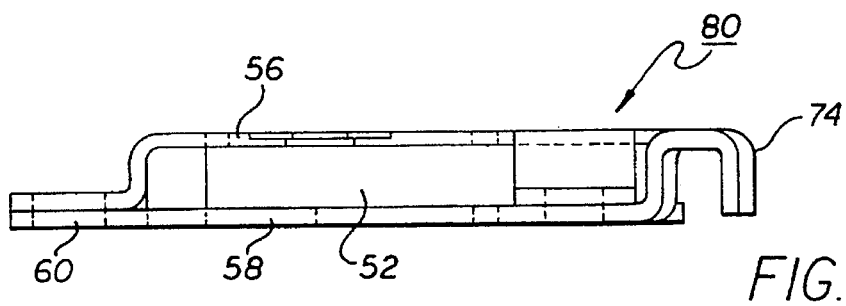

FLUX GENERATOR FOR A ROTARY ACTUATOR MOTOR WITH AN INTEGRATED ACTUATOR LATCH FOR A DISK DRIVE

This is a continuation of application Ser. No. 07/960,713, filed Oct. 14, 1992, now abandoned.

FIELD OF THE INVENTION

The present invention pertains to the field of computer system disk drives. More particularly, this invention relates to a method and apparatus for generating magnetic flux for a rotary actuator motor and actuator latch in a disk drive.

BACKGROUND OF THE INVENTION

A recent trend in the computer industry is the development of smaller form factors for portable computers. Recently developed form factors include laptop computers, as well as notebook computers and palmtop computers. As portable computers continue toward smaller form factors, the need for smaller, lighter weight, and less expensive component parts for disk drives increases.

Accordingly, disk drive manufacturers require smaller, lighter, and less expensive rotary actuator motors. A typical disk drive employs a rotary actuator motor to move an actuator for positioning the read/write heads over the disk media. Magnetic flux for the rotary actuator motor is typically generated by a magnetic circuit comprising a return plate and a pair of magnets. The return plate is usually comprised of a top plate, a bottom plate, and several standoffs. The standoffs hold the top and bottom plates apart at a fixed distance to form an air gap for receiving an actuator coil. Typically, a pair of magnets are bonded to the inner walls of the top and bottom plates.

The top and bottom plates as well as the standoffs are constructed of a magnetic permeable material such as steel. The top and bottom plates along with the standoffs form a flux return path for the magnetic field generated by the magnets. The magnetic flux density within the air gap between the magnets causes movement of the actuator when an electric current flows in the actuator coil.

However, such prior art return plate designs require fabrication of up to five parts merely to form the flux return path for the rotary actuator motor. Also, such prior art designs require extra manufacturing steps to assemble the return plate. The extra steps to fabricate the return plate component parts, along with the extra assembly steps required to assemble the return plate increases the cost of the disk drive. Also, the extra fabrication and assembly steps increases the likelihood of manufacturing errors. Moreover, the manufacturing tolerances of each component part of the return plate compound for the assembled return plate and result in increased manufacturing errors.

Further, prior art return plate designs require an extra assembly step to align a magnetic latch to the latch tab which is attached to the actuator. The extra assembly step increases the cost of the disk drive and increases the likelihood of manufacturing errors.

SUMMARY AND OBJECTS OF THE INVENTION

One object of the present invention is to provide a flux generator for a rotary actuator motor that reduces fabrication and assembly steps in disk drive manufacturing.

Another object of the present invention is to provide a low form factor light weight flux generator for a rotary actuator motor.

Another object of the present invention is to provide a magnetic latch integrated into the return plate for a rotary actuator motor in order to eliminate extra assembly steps for aligning the return plate and actuator with a magnetic latch.

These and other objects of the invention are provided by a method and an apparatus for generating flux for a rotary actuator motor in a disk drive. A magnetically permeable return plate housing forms a first air gap for receiving a coil coupled to the actuator for positioning read/write heads over a disk platter of the disk drive, and forms a second air gap for receiving a latch tab coupled to the actuator.

A magnet is coupled to an inner wall of the first air gap. The magnet generates a magnetic flux from a north pole of the magnet, through the first air gap, through the return plate housing, and to a south pole of the magnet. A pair of junctions are formed in the return plate housing. The junctions are for coupling to a pair of pins extending from a base plate of the disk drive. The return plate housing comprises a single stamped steel plate folded to form the air gap.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which:

FIG. 2 is a top view of the flux generator, and shows a magnet bonded to an inner surface of the upper portion of the return plate;

FIG. 3 is a bottom view of the flux generator showing the magnetic latch, the latch magnets, and the latch air gap;

FIG. 4 is a left side view of the flux generator, and shows an air gap for receiving the actuator coil;

FIG. 5 is a right side view of the return plate showing the air gap for receiving the actuator coil.

DETAILED DESCRIPTION

Figure 1:
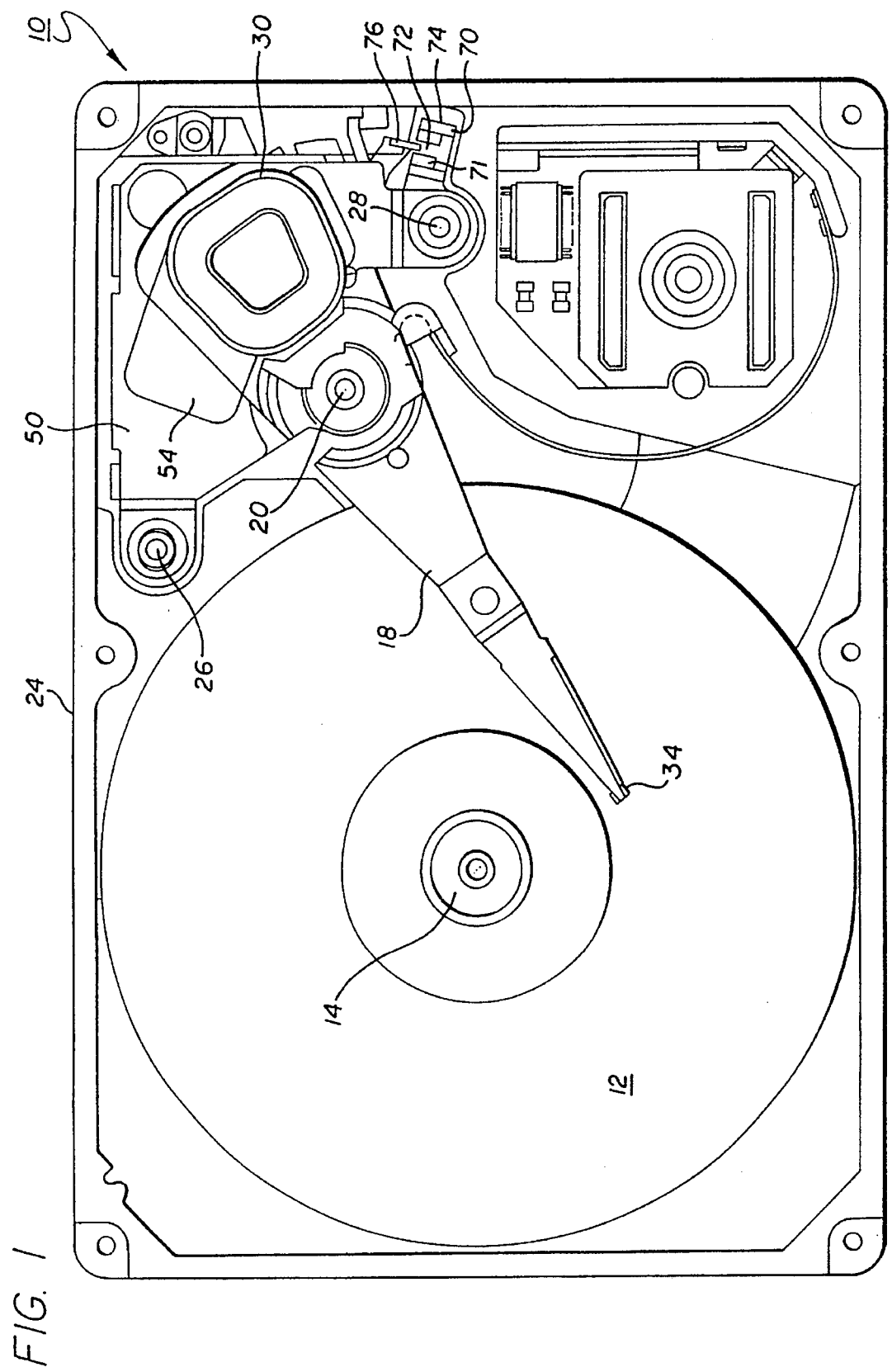
FIG. 1 shows a top view of components disposed within a disk drive, including a disk platter, a spin motor, an actuator, and a rotary actuator motor.

FIG. 1 shows a top view of the major components of a disk drive 10. The major components of the disk drive 10 are housed within a base plate 24. A disk platter 12 is coupled to a spin motor 14. The spin motor 14 causes the disk platter 12 to rotate.

An actuator bearing 20 is coupled to the base plate 24. An actuator 18 is coupled to rotate about the actuator bearing 20 in order to position a set of read/write heads 34 over the surface of the disk platter 12. A rotary actuator motor magnet 54 is shown positioned above an actuator coil 30 coupled to the actuator 18.

The actuator 18 rotates about the actuator bearing 20 under control of a rotary actuator motor comprising the magnet 54, the actuator coil 30, and a return plate 50. The actuator 18 controls the positioning of the read/write heads 34 located at the tip of the actuator 18.

A U-shaped magnetic latch 74 is formed in the return plate 50. A pair of latch magnets 70 and 71 are coupled to inner surfaces of the U-shaped magnetic latch 74 to form a latch air gap 72. The latch air gap 72 is formed between the north pole of the latch magnet 70 and the south pole of the latch magnet 71. The magnetic latch 74 captures a latch tab 76 coupled to the actuator 18. The latch tab 76 is constructed of magnetically permeable material. The latch tab 76 completes a magnetic circuit for the flux generated by the magnetic latch 74 to hold the read/write head 34 over a landing area of the disk 12.

FIGS. 2–5 illustrate a flux generator 80 for the rotary actuator motor of the disk drive 10. The flux generator 80 comprises the return plate 50 and the magnet 54. The return plate 50 provides a magnetic flux return path for the magnetic field generated by the magnet 54. The design of the return plate 50 incorporates an upper return plate 56 and a lower return plate 58 into one stamped piece of steel formed into a U-shape for receiving the actuator coil 30.

FIG. 2 is a top view of the flux generator 80, and shows the magnet 54 bonded to an inner surface of the upper return plate 56 of the return plate 50. Also shown are a pair of junctions 60 and 62 formed onto the return plate 50. The junctions 60 and 62 couple to a pair of pins 26 and 28 extending from the base plate 24. FIG. 3 is a bottom view of the flux generator 80, and shows the magnetic latch 74 and the latch magnets 70 and 71, as well as the latch air gap 72. FIG. 4 is a left side view of the flux generator 80, and shows an air gap 52 for receiving the actuator coil 30. FIG. 5 is a right side view of the return plate 50, and shows the air gap 52 for receiving the actuator coil 30. Also shown is the magnetic latch 74.

For one embodiment, the return plate 50 is formed from a flat piece of steel 34/1000 inches thick. The return plate 50 is stamped and formed through a series of 90 degree bends. The return plate 50 has tolerances of 2/1000 inches from inner wall to inner wall. The return plate 50 is formed on a progressive die from one flat piece of steel actuated on a long bed 4-slide machine. The 4-slide machine enables both horizontal and vertical actuation while forming the return plate 50.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus for generating flux for a rotary actuator motor and for latching an actuator in a disk drive, comprising:

a magnetically permeable one piece folded metal return plate housing having a first folded portion with an upper surface being substantially in a plane and forming a first air gap and a second folded portion with a free end and forming a second air gap separate from the first air gap, the first air gap for receiving a coil coupled to the actuator, the second air gap for receiving a latch tab coupled to the actuator, said second folded portion having a plurality of folded parts including a first folded part that defines a wall having an inner section that extends substantially perpendicularly to said upper surface of said first folded portion and with said second air gap having an opening with a mouth located between said free end and said wall, said mouth of said opening being in a plane that is substantially parallel to said plane of said upper surface of said first folded portion;

a first magnet coupled to an inner wall of the first folded portion, the first magnet generating a first magnetic flux from one pole of the first magnet through the air gap, through the first folded portion of the return plate housing, and to an opposite pole of the first magnet; and a pair of horizontally opposing and spaced apart magnets disposed within the second air gap, with at least one of said pair of magnets coupled to said inner section of said wall of said second folded portion, wherein said wall of said first folded part of said second folded portion is disposed between said one magnet of said pair of magnets and said first magnet, the horizontally opposing magnets generating a second magnetic flux for capturing the latch tab, such that the second magnetic flux flows within the second air gap between the horizontally opposing magnets and through the second folded portion.

2. The apparatus of claim 1, wherein a pair of junctions are formed in the return plate housing, the junctions for coupling to a pair of pins extending from a base plate of the disk drive.

3. The apparatus of claim 1, wherein the return plate housing comprises a single stamped steel plate folded to form the first and second air gaps.

4. The apparatus of claim 1, wherein the horizontally opposing magnets comprise:

second magnet having a north pole and a south pole;

third magnet having a north pole and a south pole, the south pole of the third magnet facing the north pole of the second magnet, such that the second air gap is formed between the second magnet and the third magnet.

5. A method for generating flux for a rotary actuator motor and for latching an actuator in a disk drive, comprising steps of:

forming a one piece magnetically permeable return plate housing by folding a flat metal member into a first folded portion having an upper surface being substantially in a plane and a first air gap and a separate second folded portion having a free end and a second air gap, the first air gap for receiving a coil coupled to the actuator and the second air gap in the one piece magnetically permeable return plate housing for receiving a latch tab coupled to the actuator, said step of forming said second folded portion including providing a wall having an inner section that extends substantially perpendicularly to said upper surface of said first folded portion and said forming step further including creating an opening to said second air gap with a mouth located between said free end and said wall of said second folded portion, said mouth of said opening being in a plane that is substantially parallel to said plane of said upper surface of said first folded portion;

coupling a first magnet to an inner wall of the first folded portion, the first magnet generating a first magnetic flux from one pole of the first magnet, through the first air gap, through the first folded portion of the return plate housing, and to an opposite pole of the first magnet; and coupling at least one of a pair of magnets to said inner section of said wall of the second folded portion so as to have a portion of said second air gap between said pair of magnets, said wall being disposed between the second air gap and the first air gap, the pair of magnets generating a second magnetic flux for capturing the latch tab, such that the second magnetic flux flows across the second air gap between the pair of magnets and through the second folded portion.

6. The method of claim 5, further comprising the steps of forming a pair of junctions in the return plate housing, the junctions for coupling to a pair of pins extending from a base plate of the disk drive.

7. The method of claim 5, wherein the return plate housing is formed from a single stamped steel plate folded to form the first and second air gaps.

8. The method of claim 5, wherein the horizontally opposing magnets comprise:

second magnet having a north pole and a south pole;

third magnet having a north pole and a south pole, the south pole of the third magnet facing the: north pole of the second magnet, such that the second air gap is formed between the second magnet and the third magnet.

9. The method of claim 5 wherein the step of forming further includes providing a second folded part and a third folded part, with said free end of said second folded portion being associated with said third folded part and said third folded part being substantially parallel to said first folded part.

10. A return plate for a disk drive rotary actuator motor and for latching an actuator in a predetermined position, said return plate comprising a one piece magnetically permeable metal plate having a first folded portion having an upper surface definable as being in a plane for receiving an actuator magnet therein and forming a first air gap for receiving a coil coupled to the actuator and a separate second folded portion having a free end for receiving a pair of spaced magnets forming a second air gap spaced from said first air gap for receiving therein a latch tab coupled to the actuator, said second folded portion having a plurality of folded parts including a first folded part defining a wall, with said wall extending substantially perpendicularly to said upper surface of said first folded portion and said second air gap having an opening with a mouth located between said free end and said wall, said mouth of said opening being in a plane that is substantially parallel to said plane of said upper surface of said first folded portion, said wall being disposed between said first and second air gaps.

* * * * *